United States Patent [19]

Grossman et al.

[11] Patent Number: 5,224,778
[45] Date of Patent: Jul. 6, 1993

[54] TEMPERATURE VERIFICATION FOR POLYMERASE CHAIN REACTION SYSTEMS

[75] Inventors: Robert L. Grossman, Southbury; James W. Frey, Orange, both of Conn.

[73] Assignee: The Perkin Elmer Corporation, Norwalk, Conn.

[21] Appl. No.: 716,719

[22] Filed: Nov. 12, 1991

[51] Int. Cl.⁵ .................. G01K 1/14; G01K 7/00; G01K 7/18; G01K 13/00
[52] U.S. Cl. ...................... 374/183; 374/208; 374/141
[58] Field of Search .................. 374/183, 208, 141

[56] References Cited

U.S. PATENT DOCUMENTS

| | | | |
|---|---|---|---|
| 3,754,465 | 8/1973 | Romito et al. | 374/106 |
| 3,769,932 | 11/1973 | Romito et al. | 374/106 |
| 3,822,598 | 7/1974 | Brothers et al. | 374/183 |
| 4,008,614 | 2/1977 | Turner et al. | 374/183 |
| 4,818,119 | 4/1989 | Busch et al. | 374/208 |
| 5,139,345 | 8/1992 | Schafer et al. | 374/208 |

FOREIGN PATENT DOCUMENTS

| | | | |
|---|---|---|---|
| 0047527 | 3/1986 | Japan | 374/208 |
| 0144532 | 7/1986 | Japan | 374/208 |

*Primary Examiner*—Thomas B. Will
*Assistant Examiner*—Diego F. F. Gutierrez
*Attorney, Agent, or Firm*—John R. Wahl; Edwin T. Grimes

[57] ABSTRACT

Apparatus for verifying the temperature of a polymerase chain reaction system comprises a pair of conical probe tips which are shaped to fit the wells of the temperature-controlled sample block. One of the probe tips encloses a resistance thermometer device which is connected by cable to a meter outside the system. The cable passes through the other probe tip where it is warmed, thereby reducing measurement errors due to heat conductance to ambient. The probe tips are normally arranged to fit into adjacent wells of the sample block.

14 Claims, 1 Drawing Sheet

TEMPERATURE VERIFICATION FOR POLYMERASE CHAIN REACTION SYSTEMS

TECHNICAL FIELD

This invention relates to systems for amplifying nucleic acid sequences in vitro. More specifically, it relates to method and apparatus for verifying the temperature of polymerase chain reaction (PCR) instruments.

BACKGROUND ART

A rapidly growing technique being employed by many molecular biology laboratories is the amplification of nucleic acid sequences. This is accomplished by means of a polymerase chain reaction (PCR) technique which may be carried out, for example, by thermal cycling instruments such as those of Perkin-Elmer Cetus. A typical instrument for automating PCR comprises a temperature-controlled sample block having a plurality of wells. A block may have, for example, 96 such wells in an 8×12 format. Each well receives a thin-walled reaction tube having a sample volume of 5-100 microliters. Nucleic acids and reagents are placed within these tubes which are then placed into wells in a temperature-controlled sample block. The system is then cycled through a heating and cooling sequence for achieving the desired DNA amplification.

It is important for a PCR researcher to be able to verify the accuracy, reproducibility, and uniformity of the temperatures in a PCR instrument. This is difficult to accomplish. For example, a glass liquid thermometer can measure temperatures accurately to ±0.03° C. when fully immersed. However, if only the bulb end is placed in a sample well, the accuracy of measurement is greatly reduced. Accuracy is even further eroded if the thermometer is not held in the same position for each measurement.

Thermocouple devices are also subject to inaccuracies. Their accuracy depends upon the position of the thermocouple, the thickness of the tube walls, the accuracy of fit of the tube, and the heat conductance of the thermocouple wire.

DISCLOSURE OF INVENTION

In accordance with the present invention, there is provided a probe which is shaped to closely conform to the geometry of a PCR reaction tube. It is designed to be placed within a well in the instrument sample block. The probe contains a four-wire coil platinum resistance thermometer device (RTD) which is connected by means of a cable to a digital meter outside the instrument. In a further modification of the invention, two probes are employed in a single unit. The second probe is a dummy through which the lead wires from the RTD are run. The dummy probe reduces error due to wire heat conductance to ambient and also adds to the robustness of the system by making the probes easier to handle. The RTD probe and dummy probe are normally arranged to fit into adjacent wells in the same row of the sample block.

BEST MODE FOR CARRYING OUT THE INVENTION

Figure 1:
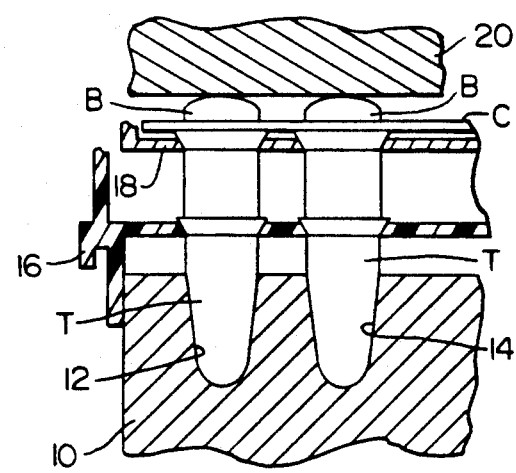
FIG. 1 is a cross section of a portion of a prior art sample block and cover with a pair of PCR reaction tubes enclosed therein.
Figure 3:
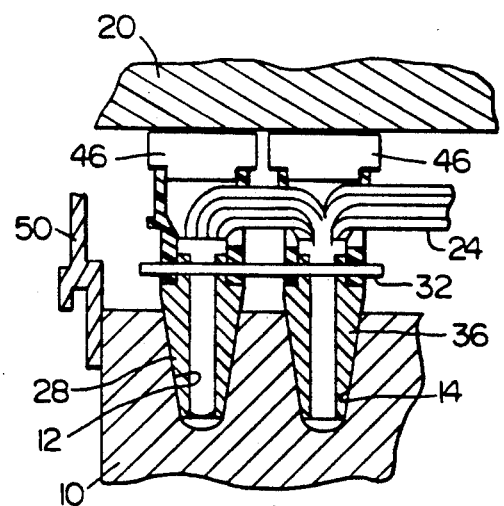
FIG. 3 is an illustration similar to FIG. 1 but illustrating a dual probe in accordance with the invention replacing the PCR reaction tubes.

With particular reference to FIG. 1, there is illustrated a portion of a sample block 10 within which are formed conical wells 12, 14. Positioned within the wells are identical PCR reaction tubes T. These tubes may be, for example, 0.5 ml. microcentrifuge tubes closed by a cap strip C having upwardly protruding buttons B. The tubes T are positioned within a tray 16 and secured by a retainer 18, both of which are known to the prior art. A heated cover 20 bears downward against the buttons B, forcing the tubes T into intimate engagement with their respective wells to thereby optimize heat transfer.

Figure 2:
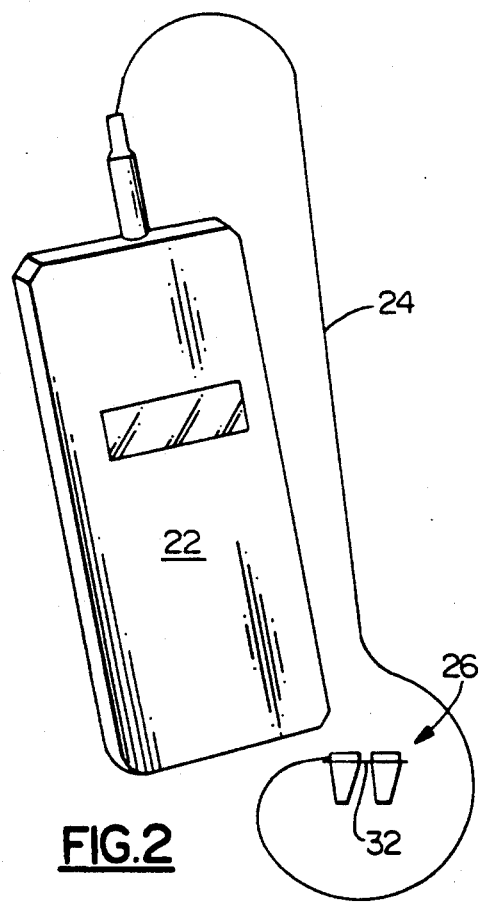
FIG. 2 is a perspective view of a digital temperature meter into which is plugged a temperature verification probe in accordance with the present invention.
Figure 5:
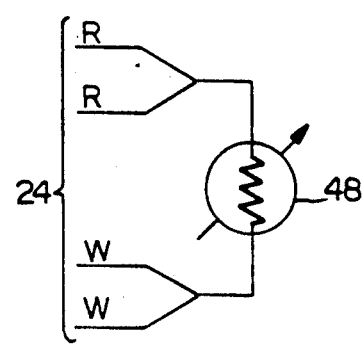
FIG. 5 is a simplified schematic of the RTD element.

In accordance with the present invention, apparatus is provided which may be positioned in selected wells of the sample block 10 for purposes of temperature verification. As illustrated in FIG. 2, such apparatus may include a hand-held digital meter 22. Examples of meters suitable for this purpose are the Models 868 and 869 digital thermometers of Omega Engineering Inc. of Stamford, Conn. Plugged into this meter by means of cable 24 is a probe assembly 26 in accordance with the present invention. Probe assembly 26 comprises a temperature measuring probe 28 and a dummy probe 30. In external geometry the measuring and dummy probes are identical, each being shaped to precisely fit into adjacent wells 12, 14 of the sample block 10. A plastic separator 32 provides the correct spacing between the probes.

Figure 4:
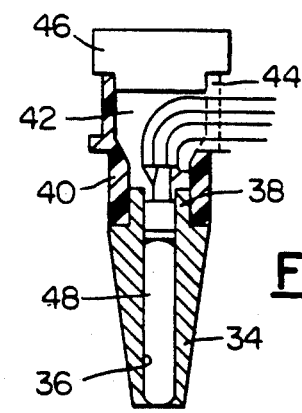
FIG. 4 is an enlarged cross section of the RTD probe shown in FIG. 3.

Each probe 28, 30 includes a conical housing 34 of a metal, such as aluminum, having good heat transmission properties. In one actual embodiment of the invention, the probes are anodized aluminum cones which precisely match the cone angles of the corresponding sample wells 12, 14. As illustrated in FIG. 4, each of the housings 34 includes a central axial opening 36 and has a reduced diameter neck 38 at its upper end. Mounted on the neck 38 is a nylon bushing 40 which defines an interior wiring space 42 and a side opening wiring slot 44. The top of bushing 40 is closed by a resilient cap 46 of silicone rubber.

The dummy probe 30 is constructed in a similar fashion to measuring probe 28. However, its nylon bushing 40 includes diametrically opposed wiring slots, for purposes to be later explained. Mounted within the housing opening 36 of the measuring probe 28 is an RTD temperature sensor assembly 48. This is a platinum sensing element, Model JA 396, obtainable from Eaton Corporation of Bethel, Conn.

The preferred sensing element is one having a 4-wire coil. The interchangeability of typical standard measuring devices is as follows:

| | |
|---|---|
| Liquid-Glass Thermometer | >±2° C. (if not seated correctly) |
| Thermocouple | >±1.0° C. (if not seated correctly) |

| RTD | |
|---|---|
| 2-wire coil | > ±0.5° C. |
| 3-wire coil | ±0.25-0.5° C. |
| 4-wire coil | > ±0.25° C. |

The cable 24 is a four wire cable which connects to the sensor assembly 48. However, before reaching the temperature measuring probe 28 the wires of cable 24 are passed downwardly into the central opening 36 of the dummy probe 30. A thermally conductive epoxy is used to retain the wires of the cable 24 within the dummy probe. The epoxy also encapsulates the RTD temperature sensor assembly 48 within the temperature measuring probe. The dummy probe 30 reduces any error due to wire heat conductance to ambient and also adds to the robustness of the system, making the probes easier to handle.

In order to provide the correct spacing between the sample block 10 and its heated cover 20 when making a temperature verification measurement, there is provided a peripheral spacer 50 which takes the place of the tray 16 used during a normal operation. When the sample cover 20 is closed, it bears against the resilient caps 46. This presses the probe assembly 26 into close fitting engagement with the wells. The resulting configuration and heat transfer characteristics correspond substantially to those achieved during actual cycling as illustrated in FIG. 1.

Using a single system constructed in accordance with the foregoing has been found to have the ability to resolve temperature gradients as small as 0.1° C. in the sample block. It is also capable of minimizing external temperature effects due to the dual cone design. The system is initially calibrated at 0° C. and 95° C. to standards that are accurate to 0.01° C. and traceable to the National Institute for Standards and Technology. Accuracy of the system, which includes meter error, probe error, and calibration error, is ±0.3° C. with a probe drift of less than 0.025° C. per year and a meter drift of less than 0.015° C. per year.

It is believed that the many advantages of this invention will now be apparent to those skilled in the art. It will also be apparent that a number of variations and modifications may be made in this invention without departing from its spirit and scope. Accordingly, the foregoing description is to be construed as illustrative only, rather than limiting. This invention is limited only by the scope of the following claims.

We claim:

1. Apparatus for verifying the temperature of a thermal cycling system useful in conducting a polymerase chain reaction (PCR) and including a temperature-programmable sample block defining a plurality of substantially conical sample wells, each adapted to receive a mating substantially conical PCR reaction tube therein, and a sample block cover for pressing each reaction tube into intimate engagement with its respective sample well, which comprises:
   a substantially conical measurement probe tip formed of a heat transmissive material and having an external geometry closely matching the geometry of a PCR reaction tube, said measurement probe tip being adapted to fit within a selected one of said sample wells;
   temperature sensing means within said measurement probe tip for providing an electrical signal representative of the perceived temperature of said sample block;
   means carried by said measurement probe tip for engagement by said sample block cover to press said measurement probe tip into intimate engagement with its sample well;
   means external of said sample block and cover for providing an output indicative of the temperature perceived by said sensing means; and
   means for conveying said electrical signal to said output providing means wherein said conveying means is an electrical cable and wherein said conveying means additionally includes a dummy probe tip having an external geometry substantially identical to said measurement probe tip and adapted for insertion into another of said wells, said dummy probe tip enclosing a portion of said cable, whereby the temperature of said cable is affected by said block.

2. The apparatus of claim 1 wherein said temperature sensing means is a resistance temperature device.

3. The apparatus of claim 2 wherein said resistance temperature device is a platinum sensing element.

4. The apparatus of claim 2 wherein each of said measurement and dummy probe tips is made of aluminum.

5. The apparatus of claim 4 wherein each of said measurement and dummy probe tips made of aluminum is anodized.

6. The apparatus of claim 5 wherein said resistance temperature device is a platinum sensing element.

7. The apparatus of claim 6 wherein said cover engagement means is a resilient member.

8. Apparatus for verifying the temperature of a thermal cycling system useful in conducting a polymerase chain reaction (PCR) and including a temperature-programmable sample block defining a plurality of substantially conical sample wells, each adapted to receive a mating substantially conical PCR reaction tube therein, and a sample block cover for pressing each reaction tube into intimate engagement with its respective sample well, which comprises:
   a substantially conical measurement probe tip formed of a heat transmissive material and having an external geometry closely matching the geometry of a PCR reaction tube, said measurement probe tip being adapted to fit within a first one of said sample wells;
   a first bushing mounted on said measurement probe tip defining a wiring space therein;
   a resilient first cap mounted on said first bushing for engagement by said sample block cover;
   a substantially conical dummy probe tip formed of a heat transmissive material and having an external geometry closely matching the geometry of a PCR reaction tube, said dummy probe tip being adapted to fit within a second one of said sample wells;
   a second bushing mounted on said dummy probe tip defining a wiring space therein;
   a resilient second cap mounted on said second bushing for engagement by said sample block cover;
   means for interconnecting said measurement and dummy probe tips at a preselected spacing distance corresponding to the distance between said first and second sample wells;
   temperature sensing means within said measurement probe tip for providing an electrical signal representative of the perceived temperature of said sample block;

means external of said sample block and cover for providing an output indicative of the temperature perceived by said sensing means; and means for conveying said electrical signal to said output providing means.

9. The apparatus of claim 8 wherein said temperature sensing means is a resistance temperature device.

10. The apparatus of claim 9 wherein said conveying means is an electrical cable.

11. The apparatus of claim 10 wherein said dummy probe tip encloses a portion of said cable.

12. The apparatus of claim 11 wherein said resistance temperature device is a platinum sensing element.

13. The apparatus of claim 12 wherein each of said measurement and dummy probe tips is made of aluminum.

14. The apparatus of claim 13 wherein each of said aluminum measurement and dummy probe tips is anodized.

* * * * *